(12) United States Patent
Lenat et al.

(10) Patent No.: US 8,024,177 B2
(45) Date of Patent: Sep. 20, 2011

(54) METHOD OF TRANSFORMING NATURAL LANGUAGE EXPRESSION INTO FORMAL LANGUAGE REPRESENTATION

(75) Inventors: Douglas Bruce Lenat, Austin, TX (US); Christopher James Deaton, Austin, TX (US); Michael John Witbrock, Austin, TX (US)

(73) Assignee: Cycorp, Inc., Austin, TX (US)

( * ) Notice: Subject to any disclaimer, the term of this patent is extended or adjusted under 35 U.S.C. 154(b) by 996 days.

(21) Appl. No.: 11/864,730

(22) Filed: Sep. 28, 2007

(65) Prior Publication Data

US 2009/0089045 A1    Apr. 2, 2009

(51) Int. Cl.
*G06F 17/27* (2006.01)
(52) U.S. Cl. .......................................... 704/9
(58) Field of Classification Search ............... 704/9
See application file for complete search history.

(56) References Cited

U.S. PATENT DOCUMENTS

| | | | |
|---|---|---|---|
| 4,829,423 A | 5/1989 | Tennant et al. | |
| 5,265,065 A | 11/1993 | Turtle | |
| 5,434,777 A | 7/1995 | Luciw | |
| 5,454,106 A | 9/1995 | Burns et al. | |
| 5,794,050 A | 8/1998 | Dahlgren et al. | |
| 5,933,822 A | 8/1999 | Braden-Harder et al. | |
| 5,963,940 A | 10/1999 | Liddy et al. | |
| 6,026,388 A | 2/2000 | Liddy et al. | |
| 6,173,279 B1 | 1/2001 | Levin et al. | |
| 6,675,159 B1 | 1/2004 | Lin | |
| 7,027,974 B1 * | 4/2006 | Busch et al. | 704/4 |
| 7,324,936 B2 * | 1/2008 | Saldanha et al. | 704/9 |
| 2006/0047632 A1 * | 3/2006 | Zhang | 707/3 |

OTHER PUBLICATIONS

Witbrock et al. ("Automated OWL Annotation Assisted by a Large Knowledge Base", in Workshop Notes of the 2004 Workshop on Knowledge Markup and Semantic Annotation at the 3rd International Semantic Web Conference ISWC2004, Nov. 2004).*

Witbrock et al. ("An Interactive Dialogue System for Knowledge Acquisition in Cyc", in Proceedings of the Workshop on Mixed-Initiative Intelligent Systems. IJCAI, 2003).*

* cited by examiner

*Primary Examiner* — Samuel G Neway
(74) *Attorney, Agent, or Firm* — Michael J. Williams

(57) ABSTRACT

This invention comprises a series of steps which transforms one or more natural language expressions into a single, well-formed formal language representation. Each natural language expression is partially parsed into simple fragments, each of which is then associated with one or more short formal expressions. Each formal expression is constructed in such a way as to contain one or more placeholder variables, each of which is associated with one or more attributes to constrain the types of entities that each variable can potentially represent. The resulting plurality of formal expressions is then filtered for relevance within a given context, and the surviving expressions manipulated based upon a plurality of rules, which are cognizant of the attributes associated with each variable contained therein. A user is then presented with the resulting plurality of formal expressions, whereupon the user optionally selects, rejects, adds to, logically connects and otherwise manipulates each member of said plurality. When the user is satisfied that the plurality represents an intended meaning, the formal expressions are combined into a single, formal representation.

23 Claims, 4 Drawing Sheets

METHOD OF TRANSFORMING NATURAL LANGUAGE EXPRESSION INTO FORMAL LANGUAGE REPRESENTATION

BACKGROUND OF THE INVENTION

The present invention addresses the need for accurate transformation of natural language expression into formal language representation within the field of computer-based information processing.

To date, no method or apparatus is capable of accurately parsing complicated natural language expression at the same level as human beings. The present invention consists of a method such that a significantly larger fraction of all possible natural language inputs can be accurately transformed into the formal language representation that computer-based information processing often requires.

A common approach to the generalized problem of natural language interpretation is to severely restrict either the domain, the input language or both. The present invention comprises a method that significantly relaxes the degree to which both the domain and input language need be restricted in order to produce a similar degree of accuracy.

SUMMARY OF THE INVENTION

The present invention comprises a series of steps which transforms one or more natural language expressions into a well-formed formal language expression. The resulting formal language representation can then be more readily utilized by downstream computer-based information processors.

One or more natural language expressions are gathered in a form that can be accessed by a computer-based information system. These expressions typically comprise full natural language paragraphs, individual sentences, fragmentary phrases, or lists of keywords. These expressions might be entered manually by means of a standard computer-based input device such as a keypad, or captured automatically by reading from any arbitrary machine-interpretable source such as an RSS newsfeed or internet accessible web site.

Each of the one or more natural language expressions are partially parsed whereby each word or short phrase is associated with one or more ontological entities. A plurality of ontological entities is associated with a single word or short phrase, each entity representing an alternative interpretation.

Each ontological entity is then used to generate one or more formal expressions. Each expression is generated in such a way as to contain one or more placeholder variables. If an ontological entity represents a predicate, then a formal expression is generated whereby the various arguments to the predicate are represented by placeholder variables. If an ontological entity represents a class or collection, then a formal expression is generated asserting that a placeholder variable is an instance or member of said class or collection.

The plurality of formal expressions are then filtered using criteria including but not limited to logical consistency, factual consistency, or contextual biases such as time, place, source, and domain. Any expression found to be inconsistent with said criteria is removed. Further, the plurality of formal expressions may be augmented in that a plurality of rules may be applied, whereby if an expression is found to match certain criteria, an additional ontological entity is created, which may then trigger the generation of a new associated formal expression as described in the previous paragraph. This process may continue iteratively as additional ontological entities trigger the generation of additional formal expressions which in turn trigger the creation of new additional ontological entities.

The filtered plurality of formal expressions is then converted into a form suitable for presentation to a user. A natural language paraphrase is typically generated for each formal expression that survives the filtering/augmentation process. Alternatively, a graphical representation might be generated for certain expressions, such as those representing temporal relationships, to promote better user comprehension.

A user is then presented with the aforementioned plurality of natural language paraphrases and/or graphical representations in such a way as to facilitate adding, subtracting, conjoining and otherwise manipulating the underlying formal expressions that the plurality represents. A subset of paraphrases and/or graphical representations may be optionally grouped by the user into one or more composite representations using logical connectives such as conjunction, disjunction and negation. Placeholder variables associated with two or more of the underlying formal expressions may be identified by the user as representing the same entity. Unifying said variables facilitates the process of combining their associated fragments during the next step.

When the user is satisfied that the resulting set of natural language paraphrases and graphical representations reflect a particular intended meaning, said user then instructs the machine to combine the plurality of underlying formal expressions into a single integrated formal representation. Said formal representation is then available for further downstream machine-based processing.

DETAILED DESCRIPTION OF THE INVENTION

Preferred Embodiment

Figure 1:
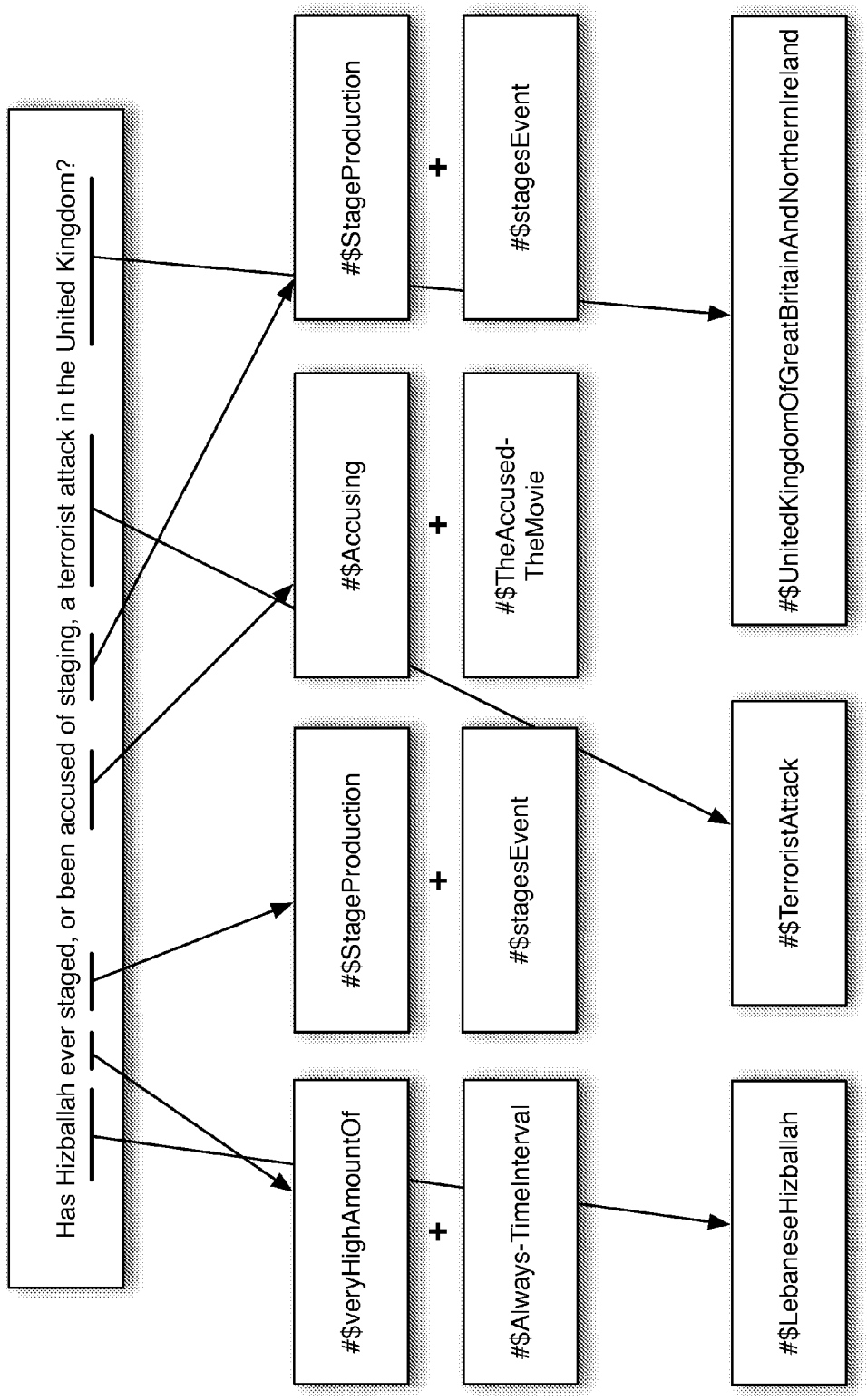
FIG. 1 illustrates the step of matching words and short phrases with one or more associated ontological entities.
Figure 2:
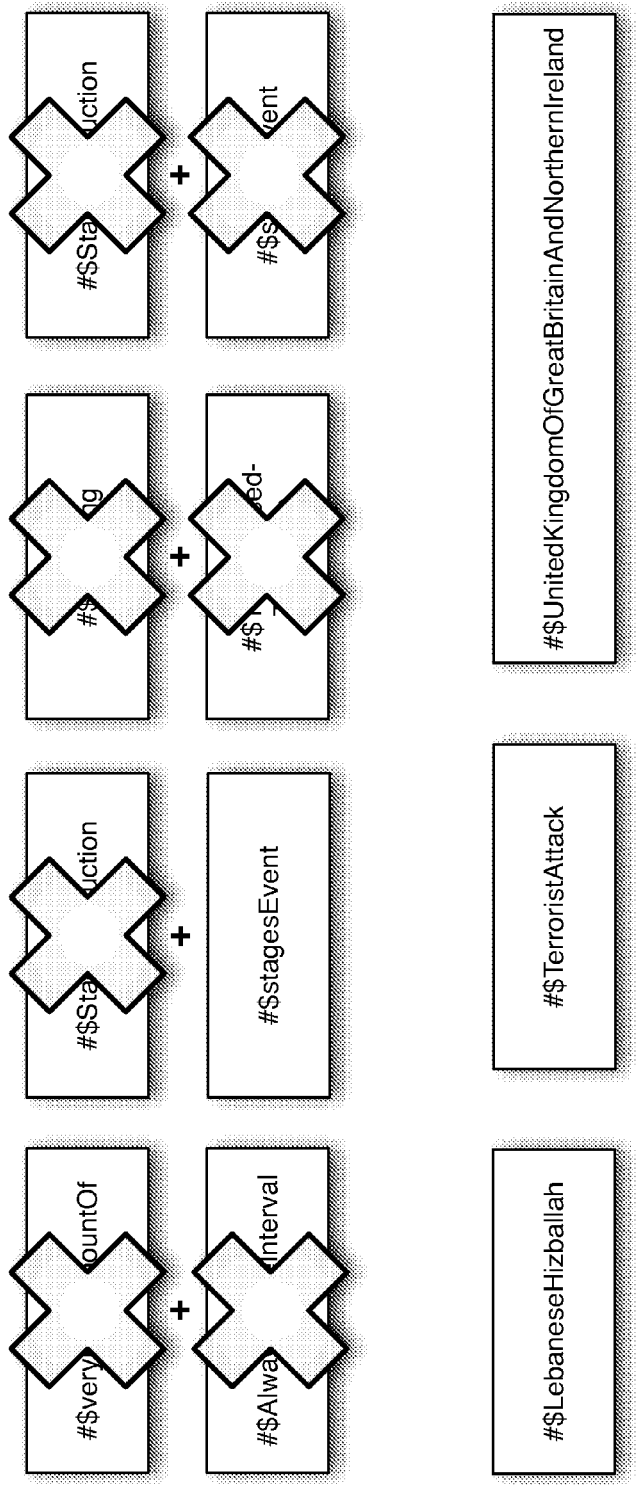
FIG. 2 illustrates the step of filtering ontological entities that are likely not relevant within the target domain.
Figure 3:
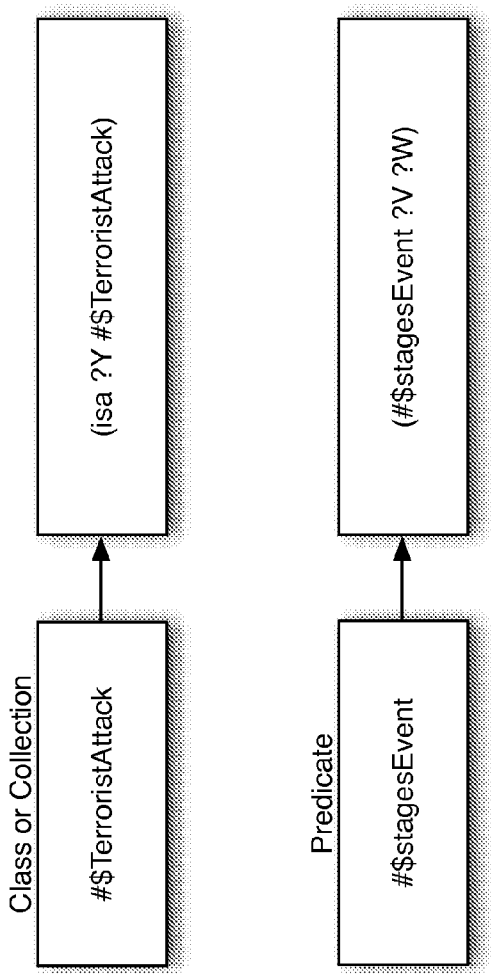
FIG. 3 illustrates the step of generating one or more formal expressions for each of the filtered predicate-class and collection-class ontological entities.
Figure 4:
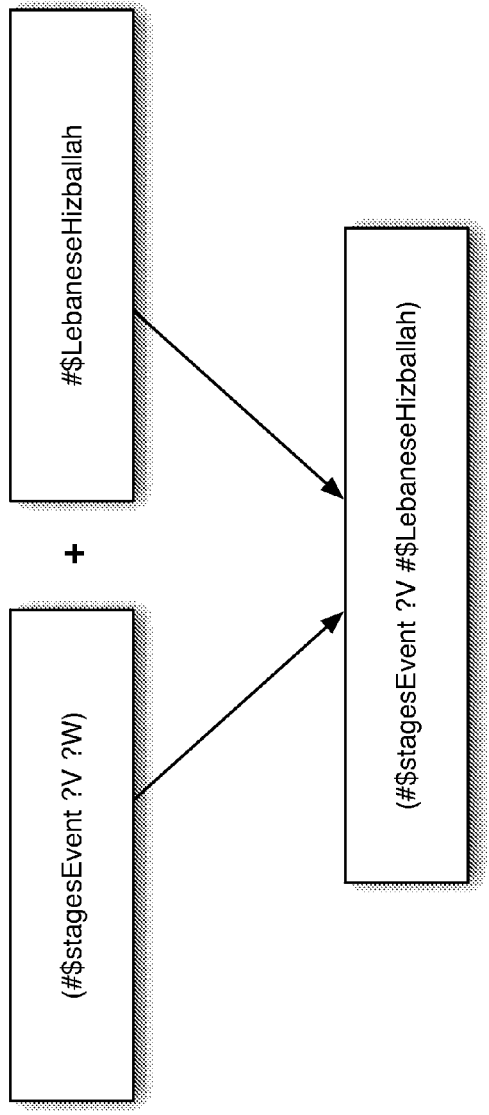
FIG. 4 illustrates the step of substituting one of the placeholder variables within a formal expression with an ontological entity that shares one or more required properties with said variable.

The present invention can be readily employed to transform a natural language query into a formal language representation, which can then be used downstream to construct a database search query using an appropriate target query language. For the purposes of this description, the formal language representation will be expressed using CycL, a language derived from predicate calculus.

One or more natural language query expressions are entered by a user using a standard computer-based keyboard input device. These expressions typically comprise queries formed as complete sentences, fragmentary phrases, or lists of keywords.

These natural language expressions are parsed, matching short natural language phrases and individual words with a dictionary. Each matched word or phrase is associated with one or more ontological entities, each ontological entity reflecting one of several alternative concepts that said word or phrase potentially represents.

For instance, consider the following query: "Has Hizballah ever staged, or been accused of staging, a terrorist attack in the United Kingdom?". The following words and short phrases are matched within the example query and associated with the listed ontological entities as expressed in CycL:

| | | | |
|---|---|---|---|
| "Hizballah" | => | #$LebaneseHizballah | |
| "ever" | => | #$veryHighAmountOf | + #$Always-TimeInterval |
| "staged" | => | #$StageProduction | + #$stagesEvent |
| "accused" | => | #$Accusing | + #$TheAccused-TheMovie |
| "staging" | => | #$StageProduction | + #$stagesEvent |
| "terrorist attack" | => | #$TerroristAttack | |
| "United Kingdom" | => | #$UnitedKingdomOfGreatBritainAndNorthernIreland | |

The resulting plurality of ontological entities are then filtered for probable relevance using a previously trained domain-specific decision tree. Those ontological entities that are deemed unlikely to be applicable to a given domain are removed.

Continuing the above example, the following ontological entities are removed via a decision tree previously trained for the domain of terrorism, because they are deemed likely not relevant:
 #$veryHighAmountOf
 #$Always-Time Interval
 #$StageProduction
 #$Accusing
 #$TheAccused-TheMovie
This results in the following plurality of relevant ontological entities:
 #$LebaneseHizballah
 #$stagesEvent
 #$TerroristAttack
 #$UnitedKingdomOfGreatBritainAndNorthernIreland At this point a set of rules specific to a given domain are applied, potentially adding new ontological entities to the mix. For example, if the entity #$TerroristAttack, or a specialization of said entity such as #$CarBombTerroristAttack, is found within the aforementioned filtered plurality of ontological entities, then a domain-specific rule might direct that the entity #$TerroristLeader also be added to said plurality.

Given a filtered plurality of ontological entities, a formal expression is then generated for each predicate-class or collection-class ontological entity. Each expression is generated as to contain one or more placeholder variables. If an ontological entity represents a predicate, then a formal expression is generated whereby the various arguments to the predicate are represented by placeholder variables. If an ontological entity represents a class or collection, then a formal expression is generated asserting that a placeholder variable is an instance or member of said class or collection.

Thus, continuing the ongoing example, the following formal expressions are generated, as expressed in CycL:
 (isa ?Y #$TerroristAttack)
 (stagesEvent ?V ?W)
Formal expressions for #$UnitedKingdomOfGreatBritainAndNorthern Ireland and #$LebaneseHizballah are not generated, because they represent neither predicates, classes nor collections.

Each generated expression contains one or more placeholder variables, each of which is associated with one or more properties describing the types of ontological entities that each variable represents. This classification of placeholder variables is then used to facilitate rule-based substitutions, whereby instances from the plurality of ontological entities are used to replace placeholder variables that share the same classification.

Continuing the example, the #$stagesEvent predicate accepts two arguments, the second of which shares a required property with the #$LebaneseHizballah ontological entity, thus allowing it to be substituted for the second argument producing the expression:
 (stagesEvent ?V #$LebaneseHizballah)

Given the generated plurality of formal expressions, a set of rules are then applied, representing constraints on said expressions. Said rules may require that certain placeholder variables within said expressions be present, having not been replaced by ontological entities as described above. Alternatively, said rules may require that certain placeholder variables within said expressions be missing, having been replaced by ontological entities as described above.

Further, said rules may provide that if no ontological entity has replaced a certain placeholder variable within a certain expression, then said placeholder variable should be replaced with a default ontological entity. Likewise, said rules may provide that if a certain class of ontological entity has replaced a certain placeholder variable within a given expression, then one or more additional ontological entities should be added to the plurality of ontological entities, triggering generation of additional formal expressions for said ontological entities, as described in paragraph 24 above. Said generation may continue iteratively, following the steps described in paragraphs 24 through 29.

Continuing the example, if the ?W argument in the #$stagesEvent predicate expression had not been matched and replaced as illustrated above, then a default rule might specify that an entity such as #$ListedTerroristOrganization be substituted, producing the expression:
 (stagesEvent ?V #$ListedTerroristOrganization)

Additionally, an example rule might specify that if the second argument of an #$is a expression contains #$TerroristSuicideBombing, then an additional expression should be generated using the predicate #$suicideAttacker, said additional expression to be conjoined with the original, producing the following composite expression:

```
(and
  (isa ?X #$TerroristSuicideBombing)
  (suicideAttacker ?X ?Y)
)
```

Prior to user review, the augmented plurality of formal expressions must be converted into a form suitable for presentation. Typically, a natural language paraphrase or graphical representation is generated for each formal expression. The various methods used to generate said paraphrases and graphical representations are well grounded in the art, and will not be described here.

Upon presentation of said paraphrases and/or graphical representations, the user optionally selects, rejects, logically connects and otherwise manipulates them. The user may choose to group certain representations using logical connectives such as conjunction, disjunction and negation. The user may also choose to unify certain placeholder variables that represent the same entity, or to remove certain representations altogether. The particulars of the presentation used to facilitate user manipulation is not the focus of this invention, but the facility to do so is integral.

At a certain point the user decides that the refined plurality of underlying formal expressions represents the desired plurality of concepts necessary to generate the desired query expression. Thus, these formal expressions are then combined to form a single formal representation.

The process of combining the resulting plurality of formal expressions proceeds as follows. Two expressions are arbitrarily selected from the plurality. Placeholder variables within the two expressions are compared as to their classification, and if found to be compatible, are unified. This process continues recursively until all expressions have been examined.

Continuing the example, assume that the following plurality of formal expressions survived the filtering and augmentation steps:
(isa ?Y #$TerroristAttack)
(stagesEvent ?V #$LebaneseHizballah)
(locationOfEvent ?W #$UnitedKingdomOfGreatBritainAndNorthernIreland)

Both the ?Y and ?V variables which represent events, will be unified. This produces the following plurality of formal expressions:
(isa ?Y #$TerroristAttack)
(stagesEvent ?Y #$LebaneseHizballah)
(locationOfEvent ?W #$UnitedKingdomOfGreatBritainAndNorthernIreland)

Likewise, both the ?Y and ?W variables also represent events, and will also be unified, producing the following plurality of formal expressions:
(isa ?Y #$TerroristAttack)
(stagesEvent ?Y #$LebaneseHizballah)
(locationOfEvent ?Y #$UnitedKingdomOfGreatBritainAndNorthernIreland)

The remaining step is to conjoin the plurality of expressions into a single formal representation. For example:

```
(and
    (isa ?Y #$TerroristAttack)
    (stagesEvent ?Y #$LebaneseHizballah)
    (locationOfEvent ?Y
    #$UnitedKingdomOfGreatBritainAndNorthernIreland)
)
```

At this point the single formal representation can be readily transformed into the desired database query, using the required database query language.

We claim:

1. A method of transforming natural language expression into formal language representation comprising the steps of:
   partially parsing one or more natural language expressions;
   associating one or more formal expressions with each parsed fragment;
   selecting an appropriate subset of said formal expressions for user review;
   converting said subset into suitable form for presentation to a user, wherein said suitable form comprises a plurality of natural language paraphrases;
   presenting said suitable form to a user wherein the user selects, rejects, adds to, logically connects, and otherwise manipulates members of said subset resulting in a plurality of formal expressions, wherein the step of presenting said suitable form to a user wherein the user selects, rejects, adds to, logically connects, and otherwise manipulates members of said subset comprises the step of presenting said plurality of natural language paraphrases to the user wherein the user indicates that certain placeholder variables within said natural language paraphrases represent the same entity and should be unified;
   combining the resulting plurality of formal expressions into a single formal representation; and
   compiling said single formal expression into one or more expressions suitable for querying a knowledge store.

2. A method of transforming natural language expression into formal language representation as recited in claim 1, wherein the steps of partially parsing by computer one or more natural language expressions into one or more parsed fragments, and associating one or more formal expressions with each parsed fragment, comprise the steps of:
   identifying ontological entities associated with one or more natural language expressions; and
   generating one or more formal expressions for each identified ontological entity.

3. A method of transforming natural language expression into formal language representation as recited in claim 2, wherein the step of identifying ontological entities associated with one or more natural language expressions comprises the steps of:
   associating words and simple phrases within each natural language expression with one or more ontological entities;
   filtering said ontological entities for relevance; and
   adding one or more additional candidate ontological entities.

4. A method of transforming natural language expression into formal language representation as recited in claim 3, wherein the step of associating words and simple phrases within each natural language expression with one or more ontological entities comprises the steps of:
   parsing short natural language phrases;
   matching unparsed natural language words with a dictionary; and
   associating found words and phrases with one or more ontological entities.

5. A method of transforming natural language expression into formal language representation as recited in claim 3, wherein the step of filtering ontological entities for relevance comprises the steps of:
   disambiguating the ontological entities using a context-specific classification tree; and
   marking those ontological entities as to their likely relevance.

6. A method of transforming natural language expression into formal language representation as recited in claim 3, wherein the step of adding one or more additional candidate ontological entities comprises the steps of:
   associating certain ontological entities with additional ontological candidates based upon a context-specific set of rules; and
   applying said associations to the existing plurality of ontological entities.

7. A method of transforming natural language expression into formal language representation as recited in claim 2, wherein the step of generating one or more formal expressions for each identified ontological entity comprises the steps of:

classifying each ontological entity as either predicate, collection or other;

associating each predicate-class ontological entity with a formal expression constructed by combining a predicate-determined template with a set of generated placeholder variables each uniquely representing a required argument; and associating each collection-class ontological entity with a formal expression asserting that a uniquely generated placeholder variable X is an instance of said ontological entity.

8. A method of transforming natural language expression into formal language representation as recited in claim 7, further comprising the steps of:

classifying each placeholder variable of a given formal expression;

matching said classification with one or more ontological entities;

substituting said placeholder variable with said ontological entity; and generating a new formal expression for each substitution or permutation thereof.

9. A method of transforming natural language expression into formal language representation as recited in claim 7, further comprising the steps of:

classifying each placeholder variable of a given formal expression;

matching said classification with one or more applicable rules;

for each match, adding an ontological entity, the type of which is determined by the applicable rule, to the plurality of identified ontological entities; and generating a new formal expression for each ontological entity added.

10. A method of transforming natural language expression into formal language representation as recited in claim 1, wherein the step of selecting an appropriate subset of said formal expressions for user review comprises the steps of:

determining that two or more formal expressions contain placeholder variables which represent the same entity; and unifying said arguments.

11. A method of transforming natural language expression into formal language representation as recited in claim 1, wherein the step of selecting an appropriate subset of said formal expressions for user review comprises the steps of:

determining that one or more formal expressions are not relevant within a given context; and removing said formal expressions.

12. A method of transforming natural language expression into formal language representation as recited in claim 1, wherein the step of selecting an appropriate subset of said formal expressions for user review comprises the steps of:

determining that one or more formal expressions are not logically consistent with a set of axioms as stored within a context-specific and/or generalized knowledge base; and removing said formal expressions.

13. A method of transforming natural language expression into formal language representation as recited in claim 1, wherein the step of presenting said suitable form to a user wherein the user selects, rejects, adds to, logically connects, and otherwise manipulates members of said subset comprises the step of:

presenting a plurality of natural language paraphrases to the user in such a way as to facilitate the grouping of said paraphrases into one or more composite representations, including but not limited to those formed using logical connectives such as conjunction, disjunction and negation.

14. A method of transforming natural language expression into formal language representation as recited in claim 1, wherein the step of presenting said suitable form to a user wherein the user selects, rejects, adds to, logically connects, and otherwise manipulates members of said subset comprises the step of:

presenting a plurality of natural language paraphrases to the user in such a way as to permit the user to indicate that certain natural language paraphrases and the formal expressions they represent should be removed.

15. A method of transforming natural language expression into formal language representation as recited in claim 1, wherein the step of presenting said suitable form to a user wherein the user selects, rejects, adds to, logically connects, and otherwise manipulates members of said subset comprises the step of:

presenting a plurality of natural language paraphrases to the user in such a way as to permit the user to add to said plurality of natural language paraphrases, along with the underlying formal expressions they represent.

16. A method of transforming natural language expression into formal language representation as recited in claim 1, wherein the step of converting by computer said subset into suitable form for presentation to a user comprises the step of:

generating a graphical representation for each formal expression.

17. A method of transforming natural language expression into formal language representation as recited in claim 1, wherein the step of presenting said suitable form to a user wherein the user selects, rejects, adds to, logically connects, and otherwise manipulates members of said subset comprises the step of:

presenting a plurality of graphical representations to the user in such a way as to facilitate the grouping of said graphical representations into one or more composite representations, including but not limited to those formed using logical connectives such as conjunction, disjunction and negation.

18. A method of transforming natural language expression into formal language representation as recited in claim 1, wherein the step of presenting said suitable form to a user wherein the user selects, rejects, adds to, logically connects, and otherwise manipulates members of said subset comprises the step of:

presenting a plurality of graphical representations to the user in such a way as to permit the user to indicate that certain placeholder variables within said graphical representations represent the same entity and should be unified.

19. A method of transforming natural language expression into formal language representation as recited in claim 1, wherein the step of presenting said suitable form to a user wherein the user selects, rejects, adds to, logically connects, and otherwise manipulates members of said subset comprises the step of:

presenting a plurality of graphical representations to the user in such a way as to permit the user to indicate that certain graphical representations and the formal expressions they represent should be removed.

20. A method of transforming natural language expression into formal language representation as recited in claim 1, wherein the step of presenting said suitable form to a user wherein the user selects, rejects, adds to, logically connects, and otherwise manipulates members of said subset comprises the step of:

presenting a plurality of graphical representations to the user in such a way as to permit the user to add to said plurality of graphical representations, along with the underlying formal expressions they represent.

21. A method of transforming natural language expression into formal language representation as recited in claim 1, wherein the step of combining the plurality of formal expressions into a single formal representation comprises the step of:

logically connecting two or more formal expressions, as directed by a user during a previous step, including but not limited to conjunction, disjunction and negation; and
    conjoining any remaining formal expressions.

22. A method of transforming natural language expression into formal language representation as recited in claim 21, further comprising the steps of:

identifying one or more formal expressions marked for removal by a user during a previous step; and
    removing said identified formal expressions.

23. A method of transforming natural language expression into formal language representation as recited in claim 21, further comprising the steps of:

identifying one or more formal expressions containing no placeholder variables; and
    removing said identified formal expressions.

\* \* \* \* \*